Feb. 16, 1932.  A. A. KRAMER  1,844,961
TANK CONSTRUCTION
Original Filed Feb. 8, 1927   2 Sheets-Sheet 1
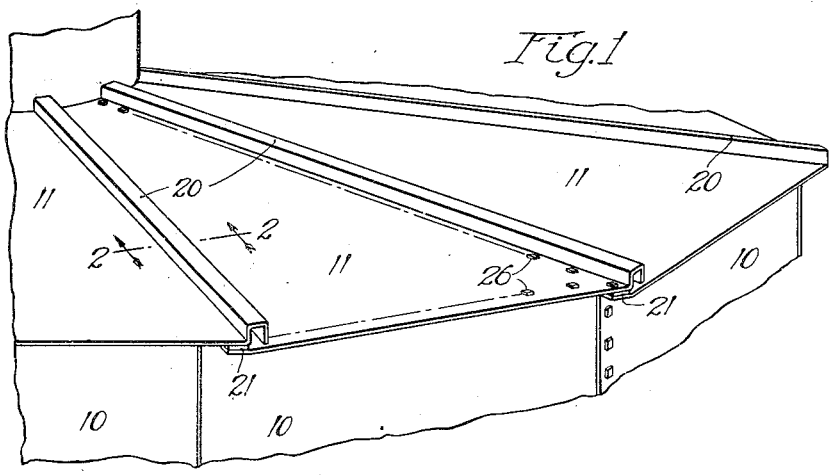
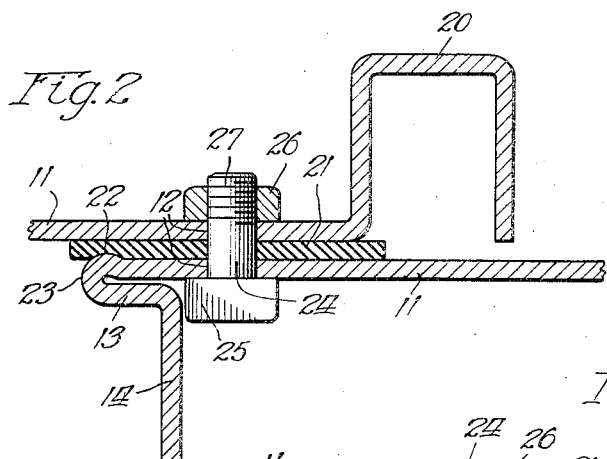
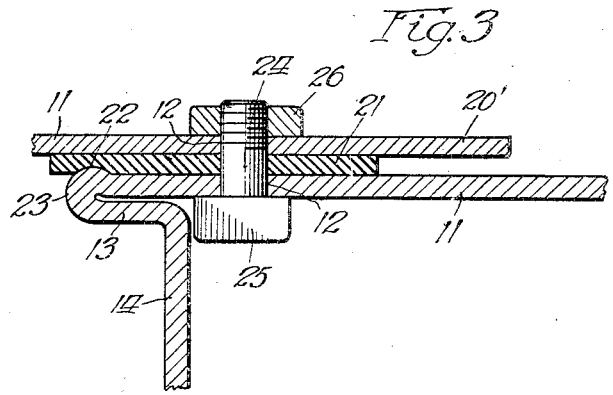
Inventor
Andrew A. Kramer
Alfred R. Fuchs
Atty.

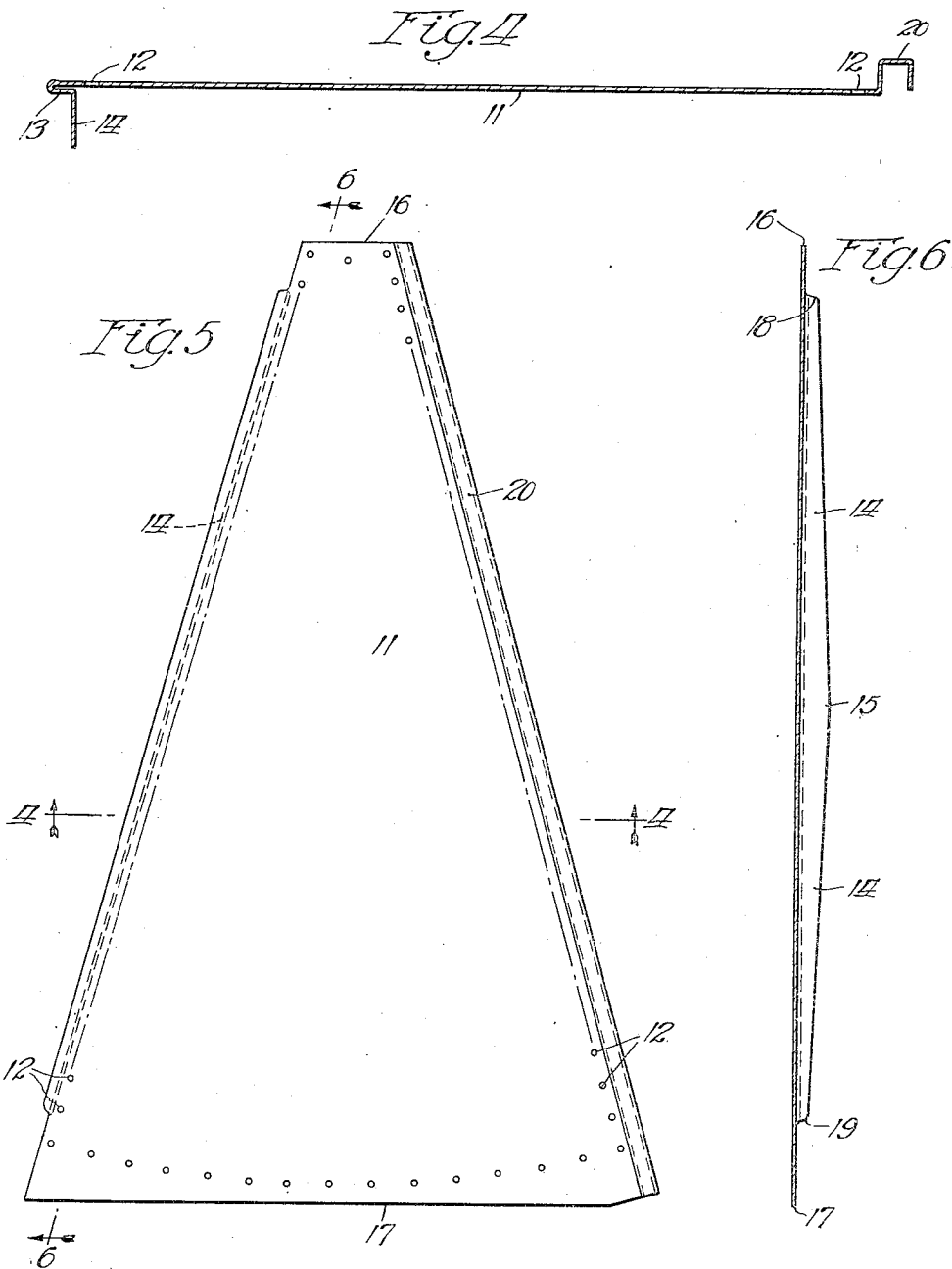

Patented Feb. 16, 1932

1,844,961

UNITED STATES PATENT OFFICE

ANDREW A. KRAMER, OF KANSAS CITY, MISSOURI

TANK CONSTRUCTION

Application filed February 8, 1927, Serial No. 166,727. Renewed December 5, 1930.

My invention relates to tanks and more particularly to the decks or roofs of tanks and a new and improved joint construction thereof.

It is a purpose of my invention to provide a new and improved joint in tank construction, whereby the tank is materially stiffened at the joints and whereby the fastening elements for securing the members of the tank together at said joints are held against turning.

It is more particularly a purpose of my invention to provide a new and improved joint in a tank roof or deck, whereby the said roof or deck is strengthened and stiffened in a radial direction. The improved joint preferably comprises a stiffening member in the form of a flange on one of the overlapping members forming the roof or deck, and said stiffening member is adapted to engage with the head portions of headed fastening members for securing the overlapping members together, so as to prevent the free turning of said fastening members. This is particularly desirable in the assembly of the tank as it facilitates the application of the nuts to the fastening elements.

The flanged stiffening member may extend in either direction from the joint, but in the preferred form extends downwardly and is preferably associated with a box flange on the other member at said joint, so that the downwardly extending stiffening and bolt holding flange and the upwardly projecting box flange cooperate to form a substantially radially extending girderlike stiffening member. While the stiffening member is preferably in the form of a flange, this is not absolutely necessary, as all that is necessary is that the same projects from the joint and lies adjacent the heads of the bolts or similar fastening elements to prevent the turning thereof.

It is also a purpose of my invention to provide new and improved means for obtaining a fluid tight joint in a tank roof or deck, by providing a rib or bead on one of the overlapping members at each of the joints to engage and compress a gasket inserted between the members forming the joint.

Other objects and advantages of my invention will appear as the description of the drawings proceeds. I desire to have it distinctly understood, however, that I do not intend to limit myself to the details of construction shown or described, but that I intend to include as part of my invention all such changes and modifications of parts as would occur to a person skilled in this art, and as would fall within the scope of the claims.

In the drawings:

Fig. 1 is a fragmentary perspective view of a tank, showing my improved joint applied to the roof or deck thereof;

Fig. 2 is a fragmentary sectional view taken on a larger scale through the joint;

Fig. 3 is a similar view of a joint from which the box flange has been omitted;

Fig. 4 is a transverse sectional view of one of the roof or deck members, said view being taken on a plane corresponding to the line 4—4 of Fig. 5.

Fig. 5 is a plan view of one of the roof or deck sections, and

Fig. 6 is a section thereof taken on a plane corresponding substantially to the line 6—6 of Fig. 5.

Referring in detail to the drawings, my improved joint is shown as being applied to a tank deck or roof, although the same can obviously be used in other places as well, as the same has certain particular advantages in such a roof or deck.

The tank is shown as having a side wall portion 10, and a roof or deck made up of segmental members or sections 11. One of said sections or segmental members is shown more in detail in Figs. 4, 5 and 6, and comprises a main body portion having rows of bolt holes 12 therein for receiving the fastening elements or bolts, by means of which the members 11 are secured together. Said bolt holes preferably lie in radially extending rows, as will be obvious from Fig. 5.

Each of the sheet metal members 11 is provided with a doubled-back portion 13 that lies closely adjacent the body portion of the member 11 and which terminates in a downwardly extending flange portion 14. It will be noted from Fig. 5 that each of the sections or members 11 is substantially segmental and the flanges 14 extend substantially in a radial direction. While the flanges 14 may be of any desired depth, the same are preferably tapered from a central point, indicated by 15, in opposite directions to form a truss-like flange on one edge of each section. The flanges 14 terminate in spaced relation to the inner edge of 16 and the outer edge of 17 of the sections as indicated at 18 and 19 respectively. An upward extending box flange portion 20 is provided along the opposite edge of each section 11 to that having the flange 14.

The joint between each of the sections, made as shown in Figs. 4, 5 and 6, is shown more in detail in Fig. 2. It will be evident from Fig. 2 that the members 11 are arranged in over-lapping relation along the radial edges thereof, and when a fluid tight construction is desired a gasket 21 of suitable compressible material is inserted between the faces of the members 11, where the same overlap. In order to provide for a tight joint a substantially radially extending rib or bead 22 is formed on each member 11 adjacent the doubled-back portion 13 thereof, said rib or bead embedding itself in the packing or gasket 21 to thus provide a zone within which the same is very tightly compressed. The bead or rib 22 merges with the curved surface 23 of the bend joining the doubled-back portion 13, with the main body portion of the sheet metal member 11. The row of holes 12 adjacent the flange 14 of one sheet metal member 11 alines with the row of holes 12 of the over-lapping section 11, lying adjacent the box flange 20, and fastening elements 23 are inserted through said holes to secure the overlapping portions of said members together. The fastening elements are preferably in the form of bolts having heads 25 and are provided with nuts 26, engaging with the threads 27. As the fastening elements 24 are inserted from the inside of the tank it is very desirable that the same be held from turning, when the nuts 26 are applied, without the use of any special tools. In order to accomplish this the flanges 14 are arranged relatively to the holes 12 so that the heads 25 of the fastening elements will lie closely adjacent the same. Said heads having flat side faces as is customary, which will be engaged by the flanges 14 to prevent rotation of the members 24.

While the box flange 20 is in most cases preferably associated with each flange 14 so as to form a substantially radially extending girder-like member for stiffening and strengthening the roof or deck, such box flange may be omitted if desired, as shown in Fig. 3, the sheet being extended straight from the hole 12 as indicated at 20'. The other parts in Fig. 3 are the same in construction as in Fig. 2, and the same reference numerals are accordingly applied thereto.

Having thus described my invention, what I desire to claim and secure by United States Letters Patent is:

1. In a tank, a plurality of sheet metal members having overlapping joints and fastening elements extending through the overlapped portions of said members, one of said members at each of said joints having a doubled-back portion lying beyond said fastening elements and terminating in a stiffening flange engaging said fastening elements to hold the same against turning.

2. In a tank, a plurality of sheet metal members having overlapping joints with flat wall portions, a gasket member therebetween and fastening elements extending through the overlapped portions of said members, one of said members at each of said joints having an offset toward the flat wall portion of the other member forming a gasket engaging rib thereon.

3. In a tank, a plurality of sheet metal members having overlapping joints, a gasket member therebetween and fastening elements extending through the overlapped portions of said members, said elements having flattened portions thereon, one of said members at each of said joints having a doubled back portion having a gasket engaging rib thereon and having a stiffening flange engaging said flattened portion of said fastening elements to hold the same against turning.

4. In a roof for tanks, a plurality of sheet metal members having overlapping joints comprising substantially flat portions, fastening elements extending through the flat overlapped portions of said sheets and spaced oppositely projecting stiffening members on said sheets at each of said joints.

5. In a roof for tanks, a plurality of segmental sheet metal members having substantially flat body portions having overlapping edges to provide overlapping joints, fastening elements extending through the overlapped portions of said sheets and oppositely projecting spaced substantially radially extending stiffening members adjacent the free edges of said sheets at each of said joints to form substantially radially extending girders on said roof said stiffening members lying on opposite sides of said fastening elements.

6. In a roof for tanks, a plurality of sheet metal members having overlapping flat joints, fastening elements extending through the overlapped portions of said sheets and oppositely projecting spaced stiffening members on said sheets at each of said joints said fastening elements lying between said stiffening members and having flat portions, one of said stiffening members engaging said flat portions of said fastening elements to hold the same against turning.

7. In a roof for tanks, a plurality of sheet metal members having overlapping joints, fastening elements extending through the overlapped portions of said sheets and oppositely projecting spaced stiffening members on said sheets at each of said joints, one of said stiffening members being in the form of a box flange.

8. In a roof for tanks, a plurality of sheet metal members having flat overlapping joints, fastening elements extending through the flat overlapped portions of said sheets, said elements having flat portions and oppositely projecting spaced stiffening members on said sheets at each of said joints, one of said stiffening members being in the form of a box flange and the other stiffening member engaging said flat portions of said fastening elements to hold the same against turning.

9. A plurality of sheet metal roofing members having overlapping joints and upstanding fastening elements extending through the overlapped portions of said members, said fastening elements having flat faces on the heads thereof, one of said members at each of said joints having an integral substantially vertical stiffening flange adjacent the edge thereof engaging a flat face on each of the heads of said fastening elements to hold the same against turning, said heads being under said lower member.

10. A plurality of roofing sheets having overlapping joints, upstanding fastening elements extending through the overlapping portions of said sheets, said elements having flat portions thereon, and an integral stiffening formation projecting downwardly on one of the sheets adjacent and substantially parallel to the edge thereof, said formation engaging said flat portions on said fastening elements to hold the same against turning.

11. In a sheet metal receptacle, a plurality of sheet metal members having substantially flat body portions overlapped to provide flat overlapping joints between said members, the joint forming portions of said members comprising overlapping portions each provided with a row of openings therein substantially parallel to the adjacent edges of said members aligning when said members are overlapped, and one of said members at each of said joints having an integral reinforcing and stiffening flange thereon extending substantially parallel to the row of openings in said member and in predetermined spaced relation thereto, and headed, threaded fastening elements extending through said aligning openings and having flat faces on the heads thereof engaging said flange to hold said fastening elements against turning.

12. In a sheet metal receptacle, a plurality of sheet metal members having body portions overlapped to provide flat overlaping joints between said members, the joint forming portions of said members comprising overlapping portions in substantial alignment with the body portions of the respective members, each provided with a row of openings therein substantially parallel to the adjacent edges of said members aligning when said members are overlapped, one of said members at each of said joints having a single integral reinforcing and stiffening flange thereon extending substantially parallel to the row of openings in said member and in predetermined spaced relation thereto, said flange lying on that side of the row of openings in said member which is nearest the adjacent edge of said member, and headed, threaded fastening elements extending through said aligning openings and having flat faces on the heads thereof engaging said flange to hold said fastening elements against turning, and the other member at each joint having a smooth unbroken contour from said row of openings to the adjacent edge of said member.

13. In a roof, a plurality of similar sheet metal sections having substantially flat body portions overlapped to provide flat overlapping joints between said sections, the overlapping portions of said sections comprising depending integral web portions, each of said sections being provided with a row of openings parallel to said web portions and in predetermined spaced relation thereto, the overlapping section having aligning openings and bolts extending through said openings having heads provided with flat faces engaging said web to hold said bolts against turning.

14. In a tank, a plurality of sheet metal members having overlapping joints and fastening elements extending through the overlapped portions of said members, one of said members at each of said joints having a substantially flat doubled-back portion lying entirely beyond said fastening elements and terminating in a stiffening flange engaging said fastening elements to hold the same against turning, the other member at each of said joints being substantially flat.

15. In a tank, a plurality of sheet metal members having flat overlapping joints, fastening elements extending through the flat overlapping portions of said sheets, said elements having flat portions, and oppositely projecting spaced stiffening members on said sheets at each of said joints, said stiffening members lying adjacent said flat overlapping portions of said sheets, one of said stiffening members comprising a box flange extending along the edge of one of said sheets and the other stiffening member comprising a flange lying adacent said fastening elements and engaging the flat portions thereof to hold the same against turning.

In testimony whereof I hereunto subscribe my name this 19 day of January, 1927.

ANDREW A. KRAMER.